March 27, 1934.  J. H. SHAPLEIGH  1,952,633
METHOD OF PRODUCING NITRIC ACID
Filed May 31, 1933
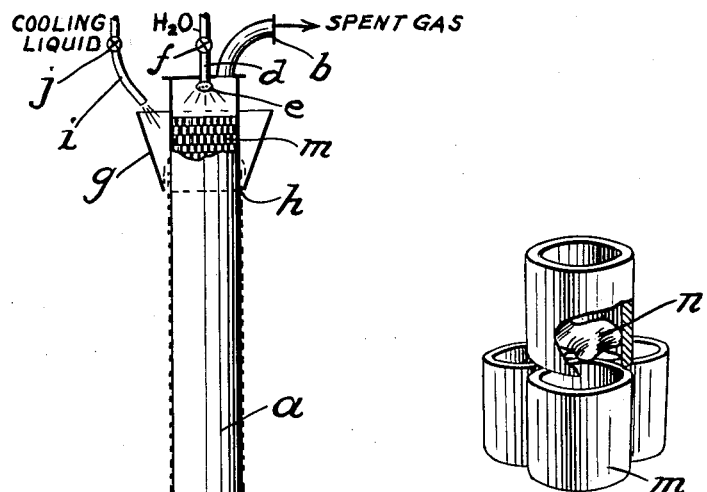
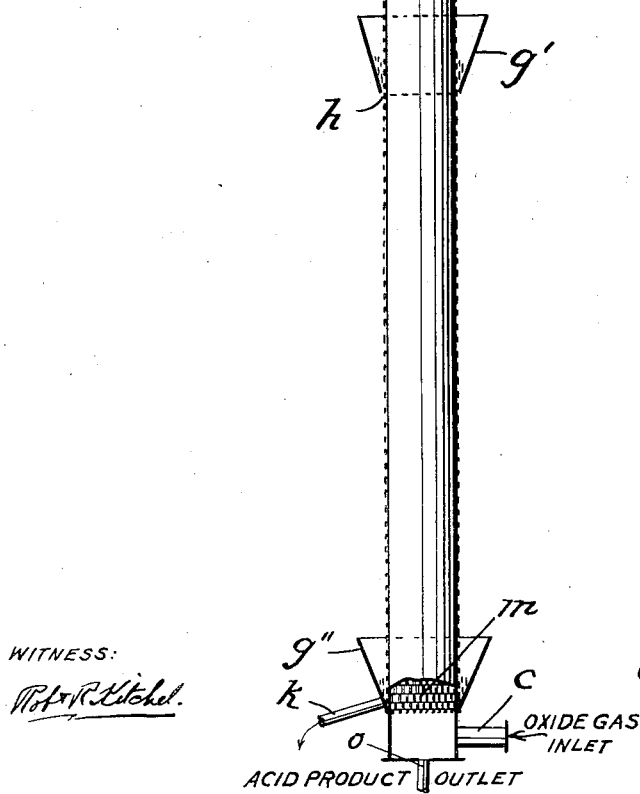
FIG. 1.
FIG. 2.
WITNESS:
Rot R Kitchel.
INVENTOR
James H. Shapleigh
BY
Bussert Harding
ATTORNEYS.

Patented Mar. 27, 1934

1,952,633

UNITED STATES PATENT OFFICE 1,952,633

METHOD OF PRODUCING NITRIC ACID

James H. Shapleigh, Wilmington, Del., assignor to Hercules Powder Company, Wilmington, Del., a corporation of Delaware Application May 31, 1933, Serial No. 673,784

9 Claims. (Cl. 23—160)

My invention relates to an improvement in method of producing nitric acid and more particularly to a novel method involving the absorption of oxides of nitrogen.

Heretofore it has been known to produce nitric acid by absorption of nitrogen oxides, and the method generally used, and known as the multiple tower method, involves the passing of the oxides in gaseous form through a series of packed towers through which nitric acid is circulated and absorbs the oxides. With the use of a series of towers, the oxides are passed through the series in counterflow with nitric acid, the first tower receiving the richest oxide vapors and the strongest acid while the last tower receives the leanest vapors and contains the weakest acid, water being added to the last tower. The nitric acid in each tower is of substantially definite strength and a large quantity of acid is circulated through each of the towers, the circulation being, for example, at the rate of from five to twenty gallons per minute, the towers being packed, for example, with quartz or some form of chemical ware ring.

Another method in general use and known as the common plate column method, involves pooling of the absorbing acid and absorption is effected, without circulation of the acid, by bubbling the oxides through the absorbing acid.

The multiple tower system is relatively inefficient due to the fact that in each of the towers equilibrium between the gases, which enter the several towers at a definite concentration, and the absorbing acid, which also enters the several towers at a definite concentration, is quickly approached and absorption practically ceases before the gases have travelled any appreciable distance in a tower in contact with the acid, with the result that a limited quantity of absorption takes place in each tower, at a given temperature, which results in great waste of tower space and excessive capital investment in towers and packing therefor. This condition of equilibrium can only be changed by a relative difference in the concentration of the gases relative to the concentration of the absorbing acid, as by the oxidation of NO to $NO_2$, which requires time. Thus, to obtain desired concentration with multiple towers it is necessary to have a large tower volume, in order to bring about changes in relative oxide concentrations for contact with the strength of acid being circulated. It is further necessary to circulate a large quantity of acid through the several towers, to minimize change in concentration and temperature, and to pass the acid and oxides from tower to tower, obtaining partial absorption in the several towers respectively until substantial total absorption is obtained. The multiple tower method is substantially inefficient due to inefficient absorption in the respective towers due to the rapidity with which a condition of equilibrium is approached and to the consequent requirement for a substantial number of towers, aggregating a large length of pass and large tower volume, and to the necessity for mechanically lifting large quantities of absorbing acid from the bottom of a preceding tower to the top of a succeeding tower to effect the circulation thereof through the system whereby the gases and acid may enter the several towers in relative concentrations such that a condition of equilibrium will not exist in the several towers on their entry.

The multiple tower system is further inefficient, due to the necessity of using relatively inefficient tower packing in order to allow circulation of the required amount of acid and to the fact that large tower volume excludes efficient heat extraction, with the result that the large quantity of acid circulated for minimizing the temperature rise, must depend upon cooling entirely apart from the tower itself. In practice, acid coolers are provided involving considerable capital expense.

Further in such system, whereas concentrated acid is the product sought, steps are taken to limit the degree of concentration obtained per tower in order to reach ultimate success. Thus, whereas a small quantity of acid circulated would tend to give greater gain in acid concentration in an individual tower, the gain in acid concentration would be harmful to absorption on its recirculation. For this reason, a large quantity of acid in circulation is necessary, and the process actually depends upon preventing normal concentration in order to obtain the ultimate concentration sought.

The common plate column method is also substantially inefficient due to the fact that in bubbling the oxide gas through the pools of absorbing acid lack of vigorous diffusion set up within the bubbles and at the interior surface thereof, where there exists a more or less dead layer of exhausted gas and a layer of concentrated acid, creates difficulties which render absorption highly inefficient. In connection with the common plate column, it will also be noted that there is an absence of multiple increments of varying acid strength, the benefit of a discontinuous rather than a continuous film, etc.

In the common plate column, an attempt is made to pass a gas of definite oxide concentration through a pool of acid capable of causing absorption, and to reach a momentary condition of equilibrium between gas and acid. The gas is then practically removed from contact with the acid, allowed to oxidize (NO to $NO_2$) and the operation repeated. Thus, while it is possible that some contact between gas and acid exists between pools, since the gas is directly over the pool through which it just passed, in essence contact has ceased. This is substantiated by practical results which show that only 30–35% efficiency of absorption takes place in one pass through the pool and the chamber above it.

The lack of efficiency in the common plate method is due as has been indicated, to the dead layers within the bubble. After the bubble breaks, suitable conditions for absorption do not exist; hence low absorption values are obtained. It is evident, that in the plate column, poor gas and acid diffusion exists, particularly the latter, local high concentrations of acid are reached within the bubbles, local high temperatures exist at the bubble walls, all bringing about poor efficiency. The result is the necessity for the use of about three times the number of plates theoretically required. The required construction with the usual gas and acid coolers results in large column volume and great expense.

The process itself is essentially one of discontinuous absorption, comprising what might be termed a series of rapid absorptions far removed from conditions of equilibrium and separated by oxidation steps wherein NO is oxidized to magnitudes of the order of 80–90%. As practiced, plate column systems are generally under pressures of 6–8 atmospheres at the present time, and utilize gases entering ammonia oxidation converters of about 8–9% $NH_3$ content by volume.

It is evident that the plate column is not dealing with thin films of acid which constantly change but rather with bulk acid of appreciable dimensions. The plate column attempts to function on a large scale basis, trying for bulk absorption per plate, bulk oxidation per chamber and bulk extraction of heat. It does not have smooth, continuity of reaction but has the opposite,—rapidly changing intermittent sequences of reaction.

Now it is the object of my invention to provide a method and apparatus whereby nitric acid may be produced by absorption of nitric oxides in a highly efficient manner, with the production of an acid of high concentration and without substantial capital outlay or substantial operating cost.

In accordance with my invention, I provide a single one pass tower of suitable dimensions and suitably packed so that starting with water the nitrogen oxide gases will be subjected to absorption by nitric acid of constantly increasing concentration contacted in counterflow with the gases in constantly decreasing concentrations, under conditions approximating conditions of equilibrium.

In carrying my invention into practice, nitrogen oxide gases are passed in counterflow with nitric acid under conditions approximating equilibrium conditions, the acid and gases flowing oppositely in a single vertical pass in thin films, desirably of approaching uni-molecular thickness, the acid being divided into an indefinitely large number of increment acid strengths, fixed by the work of absorption and blending one into another so that the acid strength gradient is a smooth one. At the same time the oxide gas is divided into an indefinite large number of increments of different concentrations blending into one another, thus both the acid strength gradient and that of the gas is smooth. In carrying my invention into practice, the nitrogen oxide gases, desirably substantially free from diluent gases, though it will be appreciated that my method is adaptable to the treatment of nitrogen oxides obtained from mixtures such as nitric and sulphuric acid as used in recovering and concentration operations, are admitted at the bottom of a vertically extending tower, preferably of substantial height as compared with its diameter, into the top of which water is admitted. The tower is so packed as to give an adequate film surface, large free space and short vertical movement, while at the same time, it is adequately cooled, for example, by water or refrigeration, so as to effect removal of the heat of reaction simultaneously with its generation. The free space, while purposely made extra large, is also purposely split up into small chambers. It is in these chambers that oxidation of NO to $NO_2$ takes place, and due to the limited unit size, oxidation occurs only to a small extent therein. The oxidation as a whole takes place through the large free space provided when all of the small chambers are considered in aggregate. The chambers, so provided by splitting up the free space into an unusually large number of small units is essential to the functioning of the tower so close to its equilibrium conditions, and hence to the advantages obtained.

The water entering the top of the tower, in quantity sufficient for the concentration desired, absorbs upwardly flowing oxides forming dilute nitric acid, and flowing downwardly through the tower at a relatively slow rate under control of the packing therein continues to absorb oxides becoming constantly more concentrated. As its downward flow progresses, absorption is facilitated by the adequate film surface and adequate free space, and by the fact that the oxide gases in their upward passage through the tower are contacted with the absorbing medium at ever decreasing concentrations of oxides and by the fact that while as the NO of the upwardly flowing gases oxidizes to $NO_2$, it is contacted with acid of nearly the exact strength to establish a condition of equilibrium at the point of contact, which in the counterflow of acid and gases the $NO_2$ is immediately afterward contacted with acid of a slightly weaker strength which promotes absorption and so on throughout the tower, with the result that oxidation and absorption continues from the bottom to the top of the tower smoothly and without the existence of a single state of equilibrium for any appreciable distance up the tower and with discharge from the tower of highly concentrated acid.

The practical adaptation of the method embodying my invention will, it is believed, be understood in connection with the following description of a preferred embodiment of a form of apparatus embodying my invention, as illustrated in the accompanying drawing, and adapted for use in the practice of the method, the practice of which, however, it will be understood, is not dependent upon the use of any particular form of apparatus.

In the drawing:

Fig. 1 is a diagrammatic view of a tower embodying my invention, partly broken away to disclose the packing.

Fig. 2 is a detail view, in perspective and partly broken away, of a form of packing for the tower shown in Fig. 1.

In the drawing a indicates a vertically extending tower, which may be made of chrome iron and may conveniently be, say, thirty to forty feet in height and of a diameter of, say, from eight to fourteen inches, though it will be understood that the exact size of the tower within relatively wide limits is unimportant, it being only necessary that the tower be provided with means for adequately removing the heat of reaction, or that it be of a diameter such that the cooling means herein described may effectively remove the heat. At the top of the tower is provided a pipe b through which the spent gases pass from the tower, while at the bottom of the tower a pipe c is provided through which the nitric oxide gases to be absorbed are admitted to the tower. A pipe d, connected to a water supply, extends into the top of the tower and is provided on its end within the tower with a spray head e. The pipe d is provided with a suitable valve f for control of the supply of water to the tower.

Adjacent to the top and bottom of the tower a, and also intermediate the top and bottom, are positioned flanges g, g' and g''. The flanges g and g' are arranged so as to provide annular openings h about the outer surface of the tower, while the flange g'' is closed with the wall of the tower. A pipe i provided with a valve j affords a supply of water to the flange g and a pipe k drains the flange g'' which receives water flowing down the outer surface of the tower from flange g to and through flange g'. A pipe o serves for withdrawdrawing the concentrated acid from the bottom of the tower a.

The tower a is packed with a suitable packing, which may, for example, be as is illustrated in detail in Fig. 2, comprising a plurality of glass cylinders m superimposed on one another and within each of which is an insert, as for example, an irregular lump of quartz n, or of chemical ware, of a size substantially less than the interior area of the cylinders. The packing is of a type having high surface value and large free space. The packing is made of a breadth and height and has a center piece such that for a given flow of liquid a given flow of gas produces conditions of turbulence favorable to both heat transfer and absorption.

By way of illustration, in carrying out the method according to my invention with use of the apparatus described above, nitrogen oxide gas, desirably though not essentially substantially free from diluent gases, is admitted to tower a through pipe c from any suitable source. Water is admitted to the top of the tower in the form of a spray from pipe d and water is admitted to the flange g through pipe i.

The nitrogen oxide gases rise in the tower through the packing, which retards their progress and causes them to travel horizontally in travelling generally in a single vertical direction upward through the tower. The gases are also caused to spread out by the packing elements. The water entering the tower flows downwardly in the tower in counterflow to the rising gases and its flow is retarded by the packing and it is caused to flow horizontally in flowing generally vertically and is spread out in films on the packing. The upward flowing gases contact with the downward flowing water adjacent to the top of the tower and absorption of the oxides by the water takes place, producing at the top of the tower a weak nitric acid which, continuing the flow downward through the tower in contact with the upward flowing oxides, continues to absorb oxides and becomes more and more concentrated. The water supplied to flange g flows therefrom through the opening h and down over the surface of the tower to the flange g' from which it flows downward over the surface of the tower to the flange g'' from which it is drained by pipe k. The water flowing downward over the surface of the tower acts to extract therefrom the heat of reaction arising in the absorption of the oxides by the nitric acid as soon as it is developed.

In carrying my invention into practice, just enough water is introduced at the top of the tower to produce an acid of predetermined strength, say, 60%, at the bottom of the tower, and it will be noted that the acid descending in the tower will be in a very large number of increment acid strengths and in very small increments of lineal length of pass. For example, the acid strength at two points in the tower, say one inch apart, will have different strengths of nitric acid present, thus the total pass of a tower, say twenty feet high, may be divided into, for example, one hundred or ten thousand increment acid strengths according to the size of the increment chosen. It will further be noted that, by virtue of the particular packing in the tower, adequate free space is provided and that the spreading out of the gases and absorbing acid over a large film surface and slow flow is insured.

In accordance with my invention it will be noted that absorption is chemically made possible to a far more efficient degree than heretofore, since the large number of acid strengths in the relatively short length of pass make possible the practical attainment of requisite equilibrium conditions in a shorter length of pass and with much less volume requirement than heretofore. For example, given a definite nitric oxide concentration in contact with a definite strength of nitric acid at a temperature of say 30° C. for a given length of time, only a definite quantity of absorption can take place before equilibrium exists. If, however, the remaining gas is contacted with acid of a lower strength, a new equilibrium will exist and further absorption will take place, as occurs in accordance with my method in the provision of a large number of increments of different acid strengths from weak to strong. Further, while the path of regenerated NO is opposite to that of $NO_2$ being absorbed and tends to retard the absorption reaction, and while the regeneration of NO takes place at the liquid surface, and tends to set up a film of inactive material, in my process, the effect of regeneration is greatly off-set, due to the change in acid strengths which shifts the equilibrium and allows more NO to be liberated from absorbed $NO_2$; and to the favorable conditions of active films and turbulence present.

It will be understood that where in connection with disclosure of this invention reference is made to concentrated nitric acid, nitric acid of a concentration of from about 50% to upwards of the maximum theoretical concentration obtainable by absorption, which is about 67%, is contemplated and that where in describing the modus operandi in connection with practical adaptation of this invention the admission of water to the top of the tower or pass is referred to, it will be understood that the use essentially of water is intended. It will be understood that water containing as much as say about 5% of nitric acid may be used and that such is contemplated as an absorbing medium consisting initially essentially of water within the purview of this invention.

Thus, to sum up, it will be noted that as a result of my invention the efficient production of nitric acid is effected with small volume and relatively short length of pass, with practically no requirement for power and a minimum of capital outlay.

This application is a continuation in part of application filed by me, Serial No. 335,480, filed January 28, 1929.

What I claim and desire to protect by Letters Patent is:

1. The method of producing nitric acid which includes contacting nitrogen oxide gas and an absorbing medium by counterflow progressively through a multiplicity of reaction zones in a single pass and withdrawing the heat of reaction from the pass substantially as generated.

2. The method of producing concentrated nitric acid, which includes passing in counterflow in a single continuous pass an absorbing medium, consisting initially essentially of water, and a nitrogen oxide-oxygen gas mixture and throughout the course of said pass progressively contacting said gas mixture in a multiplicity of reaction zones at decreasing concentration of nitrogen oxide and said absorbing medium at increasing concentration of nitric acid, and simultaneously oxidizing NO, produced in the absorption of nitrogen oxide by the absorbing medium, to $NO_2$.

3. The method of producing concentrated nitric acid, which includes passing in counterflow in a single continuous pass an absorbing medium, consisting initially essentially of water, and a nitrogen oxide-oxygen gas mixture and throughout the course of said pass progressively contacting said gas mixture and absorbing medium in a multiplicity of reaction zones respectively containing absorbing medium of increasing concentration of nitric acid and gas mixture of decreasing concentration of nitrogen oxide.

4. The method of producing concentrated nitric acid, which includes passing in counterflow in a single continuous pass an absorbing medium, consisting initially essentially of water, and a nitrogen oxide-oxygen gas mixture and throughout the course of said pass progressively contacting said gas mixture and absorbing medium in a multiplicity of reaction zones respectively containing absorbing medium of increasing concentration of nitric acid and gas mixture of decreasing concentration of nitrogen oxide, and withdrawing heat of reaction from the pass substantially as generated.

5. The method of producing concentrated nitric acid, which includes passing in counterflow in a single continuous pass an absorbing medium, consisting initially essentially of water, and a nitrogen oxide-oxygen gas mixture and throughout the course of said pass progressively contacting said gas mixture in a multiplicity of reaction zones at decreasing concentration of nitrogen oxide and said absorbing medium at increasing concentration of nitric acid, simultaneously oxidizing NO produced in the absorption of nitrogen oxide by the absorbing medium to $NO_2$ and extracting heat of reaction from the pass substantially as generated.

6. The method of producing concentrated nitric acid, which includes passing in counterflow in a single continuous pass an absorbing medium, consisting initially essentially of water, and a nitrogen oxide-oxygen gas mixture and throughout the course of said pass progressively contacting said gas mixture and absorbing medium in a multiplicity of small reaction zones respectively containing absorbing medium of increasing concentration of nitric acid and gas mixture of decreasing concentration of nitrogen oxide and extracting heat of reaction from the pass substantially as generated.

7. The method of producing concentrated nitric acid, which includes counterflowing in a single continuous pass an absorbing medium consisting initially essentially of water, and a nitrogen oxide-oxygen gas mixture, while causing the absorbing medium to counterflow with the gas mixture throughout the pass in thin films whereby the gas mixture of decreasing concentration of nitrogen oxide is contacted with a multiplicity of increments of absorbing medium of increasing concentration of nitric acid and simultaneously permitting the oxidation of NO, produced in the absorption, to $NO_2$.

8. The method of producing concentrated nitric acid, which includes counterflowing in a single continuous pass an absorbing medium consisting initially essentially of water and a nitrogen oxide-oxygen gas mixture, while causing the absorbing medium to counterflow with the gas mixture throughout the pass in thin films whereby the gas mixture of decreasing concentration of nitrogen oxide is contacted with a multiplicity of increments of absorbing medium of increasing concentration of nitric acid, simultaneously permitting the oxidation of NO resultant from the absorption of $NO_2$ and extracting heat of reaction from the pass substantially as generated.

9. The method of producing concentrated nitric acid, which includes counterflowing in a single continuous pass an absorbing medium consisting initially essentially of water and a nitrogen oxide-oxygen gas mixture, while causing the absorbing medium to flow longitudinally and laterally of the pass in thin films in counterflow with the gas mixture throughout the pass whereby the gas mixture of decreasing concentration of nitrogen oxide is contacted with a multiplicity of increments of absorbing medium of increasing concentration of nitric acid, simultaneously permitting the oxidation of NO resultant from the absorption of $NO_2$ and extracting heat of reaction from the pass substantially as generated.

JAMES H. SHAPLEIGH.